United States Patent
Lim et al.

(10) Patent No.: US 10,111,137 B2
(45) Date of Patent: Oct. 23, 2018

(54) APPARATUS AND METHOD FOR TRANSMITTING FEEDBACK INFORMATION USING TERMINAL ACCESSIBILITY IN A WIRELESS ACCESS SYSTEM

(75) Inventors: Jaewon Lim, Anyang-si (KR); Jeonghoon Mo, Anyang-si (KR); Jihwan Kim, Anyang-si (KR); Jeongho Kwak, Anyang-si (KR); Byounghoon Kim, Anyang-si (KR); Song Chong, Anyang-si (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 621 days.

(21) Appl. No.: 14/235,000

(22) PCT Filed: Jan. 9, 2012

(86) PCT No.: PCT/KR2012/000196
§ 371 (c)(1),
(2), (4) Date: Jan. 24, 2014

(87) PCT Pub. No.: WO2013/015500
PCT Pub. Date: Jan. 31, 2013

(65) Prior Publication Data
US 2014/0194132 A1  Jul. 10, 2014

Related U.S. Application Data

(60) Provisional application No. 61/511,553, filed on Jul. 26, 2011.

(51) Int. Cl.
*H04W 28/16* (2009.01)
*H04L 5/00* (2006.01)
(Continued)

(52) U.S. Cl.
CPC .......... *H04W 28/16* (2013.01); *H04L 5/0037* (2013.01); *H04W 72/121* (2013.01);
(Continued)

(58) Field of Classification Search
CPC ............................. H04W 24/10; H04W 84/18
See application file for complete search history.

(56) References Cited

U.S. PATENT DOCUMENTS 6,304,556 B1  10/2001  Haas
7,035,240 B1 *  4/2006  Balakrishnan ........ H04W 84/18
                                                    370/328
(Continued)

OTHER PUBLICATIONS

Park et al., "An Energy Efficient Concentric Clustering Scheme in Wireless Sensor Networks," 2009 Fifth International Joint Conference on INC, IMS, and IDC, IEEE Aug. 2009, chapter (II), pp. 58-61.

*Primary Examiner* — Jaime Holliday
(74) *Attorney, Agent, or Firm* — Birch, Stewart, Kolasch & Birch, LLP

(57) ABSTRACT

The present invention relates to a method for a base station to manage resources in order to perform beamforming in a wireless access system, the method being characterized by comprising the steps of: receiving cluster information from a cluster head; and determining, on the basis of the received cluster information, terminals to be scheduled in a cluster including the cluster head, wherein the cluster information comprises location and channel gain information for the terminals belonging to the cluster including the cluster head.

3 Claims, 9 Drawing Sheets

(51) Int. Cl.
*H04W 72/12* (2009.01)
*H04W 24/10* (2009.01)
*H04W 84/18* (2009.01)

(52) U.S. Cl.
CPC ........ *H04W 24/10* (2013.01); *H04W 72/1231* (2013.01); *H04W 84/18* (2013.01)

(56) References Cited

U.S. PATENT DOCUMENTS

| | | | |
|---|---|---|---|
| 2007/0091838 A1* | 4/2007 | Kobayashi | H04L 45/42 370/328 |
| 2008/0261639 A1* | 10/2008 | Sun | H04W 16/14 455/515 |
| 2008/0309480 A1* | 12/2008 | Youn | H04L 45/46 340/539.3 |
| 2009/0109911 A1* | 4/2009 | Nicolaou | H04W 24/10 370/329 |
| 2010/0073686 A1 | 3/2010 | Medeiros et al. | |
| 2010/0238855 A1* | 9/2010 | Yoshida | H04B 7/155 370/315 |
| 2013/0040681 A1* | 2/2013 | Lee | H04L 47/14 455/512 |

* cited by examiner

APPARATUS AND METHOD FOR TRANSMITTING FEEDBACK INFORMATION USING TERMINAL ACCESSIBILITY IN A WIRELESS ACCESS SYSTEM

CROSS REFERENCE TO RELATED APPLICATIONS

This application is the National Phase of PCT/KR2012/000196 filed Jan. 9, 2012, which claims priority under 35 U.S.C. 119 (e) to U.S. Provisional Application No. 61/511,553 filed on Jul. 26, 2011, all of which are hereby expressly incorporated by reference in the present application.

TECHNICAL FIELD

The present invention relates to a wireless access system. More particularly, the present invention relates to a method and apparatus for transmitting feedback information by using a terminal proximity.

BACKGROUND ART

Resource management is achieved in a cellular network through an inter-relation of a base station (BS) association problem of a user (or terminal), a user selection problem, and a problem of determining transmit power of a BS. In a broad sense, the resource management has a purpose of maximizing a utility of all network users or to maximize a fairness and a network capability. A user-BS association program has been researched to achieve this purpose, and there have been many researches on problems for determining a user and transmit power in every slot. However, as a technique such as orthogonal frequency division multiple access (OFDMA) or the like has recently been applied to a cellular network, a great number of subchannels and subcarriers are used, and as a result, a technique for achieving the broad sense purpose of the network requires a feedback of a great channel gain.

That is, a resource management method under the present cellular network system has to transmit a great amount of feedback information from a terminal to a BS, which increases a great complexity of calculation amount in the BS.

DISCLOSURE OF THE INVENTION

The present invention aims to provide a method in which terminals close in distance to each other are aggregated into one cluster according to a result of analyzing a proximity based on a human mobility feature, and a location of one of the terminals with respect to the remaining other terminals and channel gain information are fed back to a base station (BS).

In addition, the present invention aims to provide a resource management method for determining terminals to be scheduled in a next transmission time by using a cluster head and feedback information provided from terminals to be scheduled.

There is provided a method of managing a resource by a base station in a wireless access system. The method may comprise: receiving cluster information from a cluster head (CH); and determining, on the basis of the received cluster information, terminals to be scheduled in a cluster including the CH, wherein the cluster information includes channel gain information and location information for terminals belonging to the cluster including the CH.

The CH may indicate a representative terminal among the terminals belonging to the cluster.

The cluster may be formed between neighboring terminals by exchanging the location information between terminals.

The method may further comprise: receiving channel quality indication feedback information from the CH and the terminals scheduled in the cluster; and determining, on the basis of the received channel quality indication feedback information, terminals to be scheduled in a next transmission cycle The CH may determined by the steps of: exchanging a cost calculated by each of terminals belonging to the cluster between the terminals by using near field communication; determining, on the basis of the exchanged cost, the CH by each of the terminals; exchanging the CH determined by each of the terminals; and if the same CH is exchanged between the terminals, determining the same CH as the CH of the cluster.

The near field communication may be bluetooth or zigbee communication.

There is also provided a method of allocating a resource from a base station in a wireless access system. The method may comprise: transmitting cluster information by a terminal to the base station; and transmitting channel quality indicator feedback information to the base station. The terminal may a cluster head (CH) indicating a representative terminal among terminals included in the cluster, and the cluster information may include channel gain information and location information for terminals belonging to the cluster including the CH.

The CH may be determined by the steps of: exchanging a cost calculated by each of terminals belonging to the cluster between the terminals by using near field communication; determining, on the basis of the exchanged cost, the CH by each of the terminals; exchanging the CH determined by each of the terminals; and if the same CH is exchanged, determining the same CH as the CH of the cluster.

There is also provided a terminal for which a resource is allocated from a base station in a wireless access system, the terminal comprising: a radio frequency (RF) unit for externally transmitting and receiving an RF signal; and a controller coupled to the RF unit. The controller may control the RF unit to transmit cluster information the base station, and controls the RF unit to transmit channel quality indicator feedback information to the base station, and the cluster information may include channel gain information and location information for terminals belonging to a cluster including a cluster head (CH).

According to the present invention, a cluster head transmits channel gain information and a location of terminals in a cluster, and thus a feedback amount transmitted from the terminals to a base station (BS) can be decreased.

That is, if a method proposed in the present invention is used when a BS and a terminal manage a cellular resource by using many subcarriers, it is possible to decrease an excessive feedback amount generated by utilizing a similarity of a channel gain of a proximate terminal, and a resource can be managed with a less computation amount and an easier implementation than the existing method from a perspective of the BS.

In addition, by finally determining a size and cycle of a cluster to manage a resource, the present invention can minimize power of a terminal, and can maximize a network performance by decreasing a feedback of the terminal to a maximum extent possible.

MODES FOR CARRYING OUT THE PREFERRED EMBODIMENTS

Figure 1:
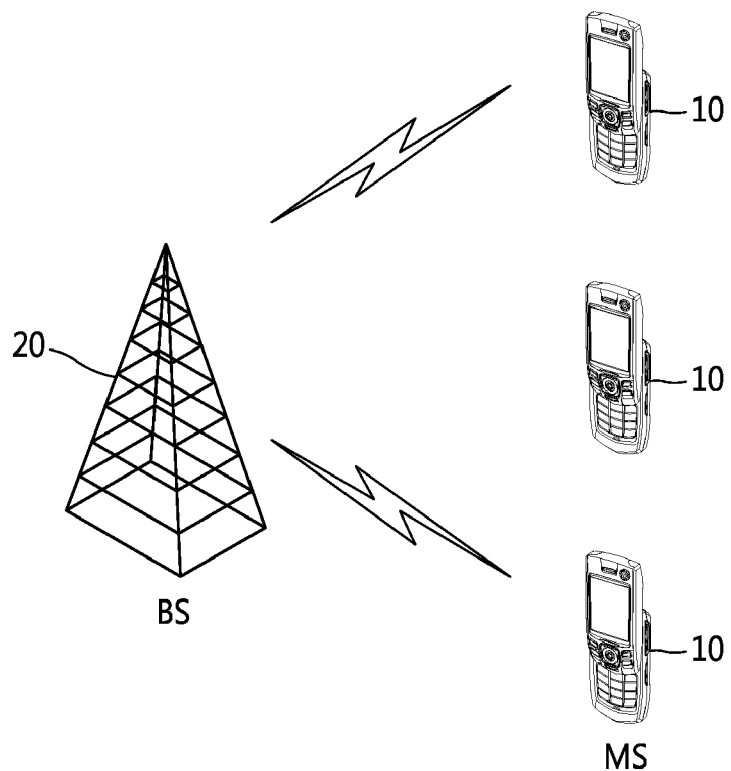
FIG. 1 is a conceptual view showing a wireless communication system according to an exemplary embodiment of the present invention.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with an IEEE 802.16e-based system.

In addition, 802.16p provides a communication protocol for supporting machine type communication (MTC).

The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is evolved from the 3GPP LTE.

Hereinafter, exemplary embodiments of the present invention will be described with reference to the accompanying drawings. It is to be noted that like reference numerals denote like components in the drawings, and a detailed description of a known structure or function of the present invention will be omitted herein if it is deemed to obscure the subject matter of the present invention. In the following description, well-known functions or constructions are not described in detail since they would obscure the invention in unnecessary detail. The exemplary embodiments should be considered in descriptive sense only and not for purposes of limitation, and do not intend to limit technical scopes of the present invention. However, it is to be understood that the invention is not limited to the disclosed embodiments, but, on the contrary, is intended to cover various modifications and equivalent arrangements included within the spirit and scope of the appended claims.

FIG. 1 is a conceptual view showing a wireless communication system according to an exemplary embodiment of the present invention. The wireless communication system can be widely deployed to provide a variety of communication services, such as voices, packet data, etc.

Referring to FIG. 1, the wireless communication system includes a mobile station (MS) 10 and a base station (BS) 20. The MS 10 may be fixed or mobile, and may be referred to as another terminology, such as a user equipment (UE), a user terminal (UT), a subscriber station (SS), a wireless device, an advanced mobile station (AMS), etc. In addition, the MS 10 includes the concept of an MS corresponding to MTC or M2M communication (i.e., an MTC MS or an M2M MS).

Meanwhile, the MS mentioned in the present invention may be a personal digital assistant (PDA), a cellular phone, a personal communication service (PCS) phone, a global system for mobile (GSM) phone, a wideband CDMA (WCDMA) phone, a mobile broadband system (MBS) phone, a hand-held personal computer (PC), a notebook PC, a smart phone, a multi mode-multi band (MM-MB) terminal, etc.

Herein, the smart phone is a terminal which combines an advantage of the PCS and the MS, and may imply a terminal which integrates a function of the PCS, i.e., schedule management and fax transmission/reception, and a data communication function such as Internet access, etc., to the MS. In addition, the MM-MB terminal refers to a terminal which can operate in all of a portable Internet system and other mobile communication systems (e.g., a code division multiple access (CDMA) 2000 system, a wideband CDMA (WCDMA) system, etc.) by embedding a multi-modem chip.

The BS 20 is generally a fixed station that communicates with the MS 10 and may be referred to as another terminology, such as a node-B, a base transceiver, system (BTS), an access point, etc. There may be one or more cells within the coverage of the BS 20.

In addition, the wireless communication system may be a system based on orthogonal frequency division multiplexing (OFDM)/orthogonal frequency division multiple access (OFDMA).

The OFDM uses a plurality of orthogonal subcarriers. Further, the OFDM uses an orthogonality between inverse fast Fourier transform (IFFT) and fast Fourier transform (FFT). A transmitter transmits data by performing IFFT on the data. A receiver restores original data by performing FFT on a received signal. The transmitter uses IFFT to combine the plurality of subcarriers, and the receiver uses FFT to split the plurality of subcarriers.

A method proposed in the present invention described hereinafter includes: 1) a feedback information transmission method using a cluster and a cluster head (CH); and 2) a resource management method and power control method of a BS by using the feedback information transmission method.

Figure 2A:
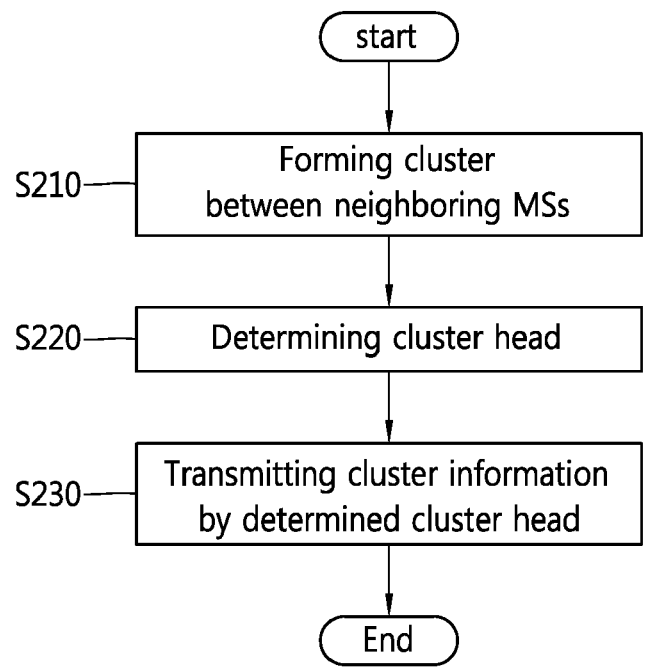
FIG. 2A is a flowchart showing a feedback information transmission method using a cluster head according to an embodiment of the present invention.
Figure 2B:
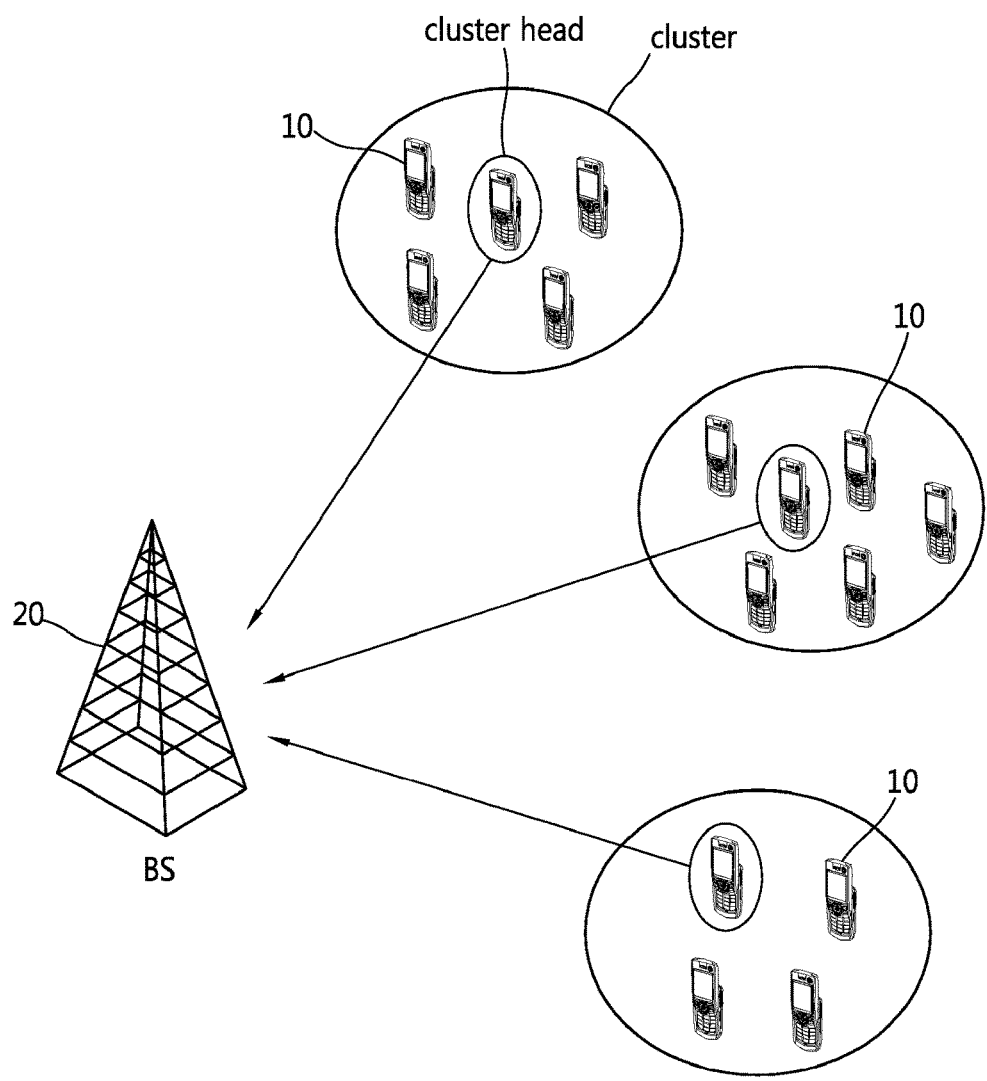
FIG. 2B shows a feedback information transmission method using a cluster head according to an embodiment of the present invention.

FIG. 2A is a flowchart showing a feedback information transmission method using a cluster head according to an embodiment of the present invention. FIG. 2B shows a feedback information transmission method using a cluster head according to an embodiment of the present invention.

Referring to FIG. 2A, a cluster is formed between neighboring (or proximate) MSs by using each MS's location information or channel gain information, etc. (step S210). Herein, the cluster may be formed by a BS or each MS. That is, each MS forms a cluster between the neighboring MSs by recognizing the existence of the neighboring MSs. In this case, cluster information formed by each MS may be transmitted to the BS.

FIG. 3 and FIG. 4 show graphs which analyze a proximity of an MS.

Figure 3A:
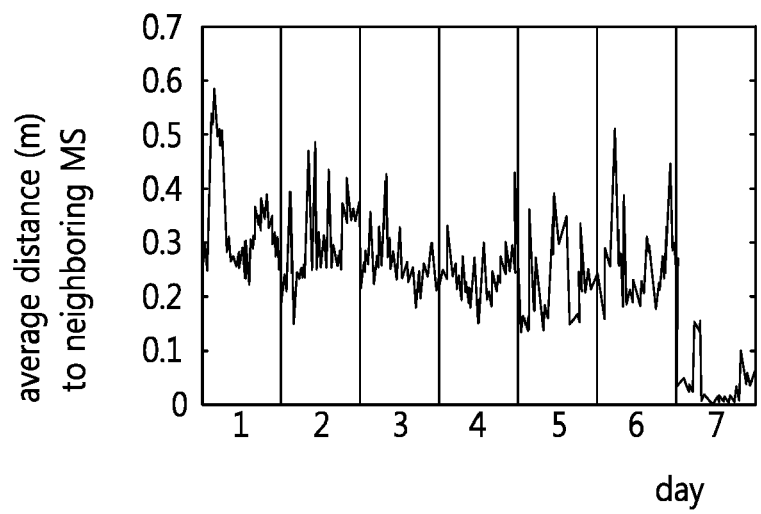
FIGS. 3A and B and FIGS. 4A and B show graphs which analyze a proximity of a mobile station (MS).
Figure 4A:
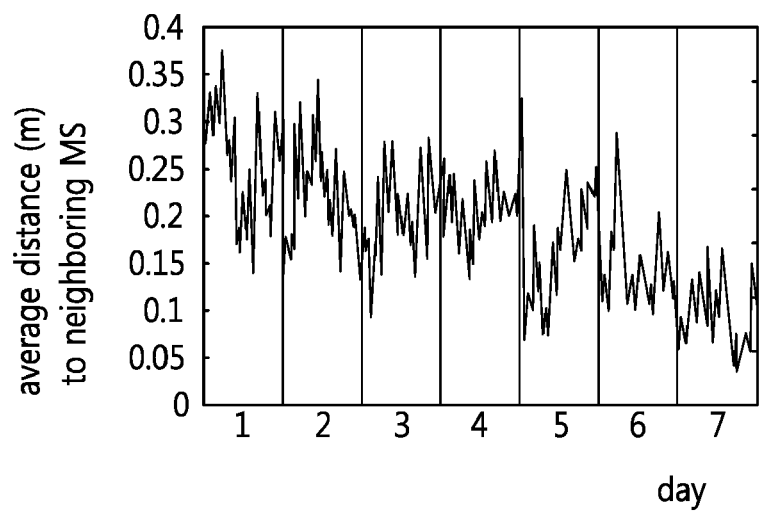

That is, FIGS. 3A and B and FIGS. 4A and B show graphs for analyzing a measurement of a GPS trace with respect to students in campuses of KAIST (Korea Advanced Institute of Science and Technology) of Republic of Korea and NCSU (North Carolina State University) of U.S.A.

Figure 3B:
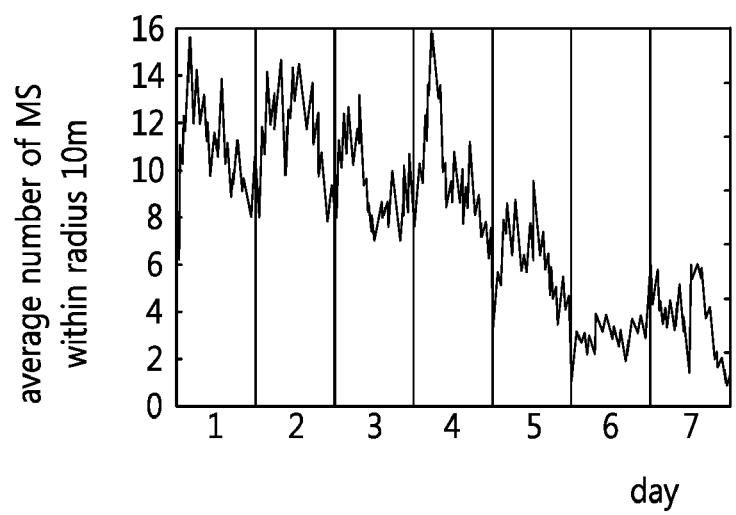
Figure 4B:
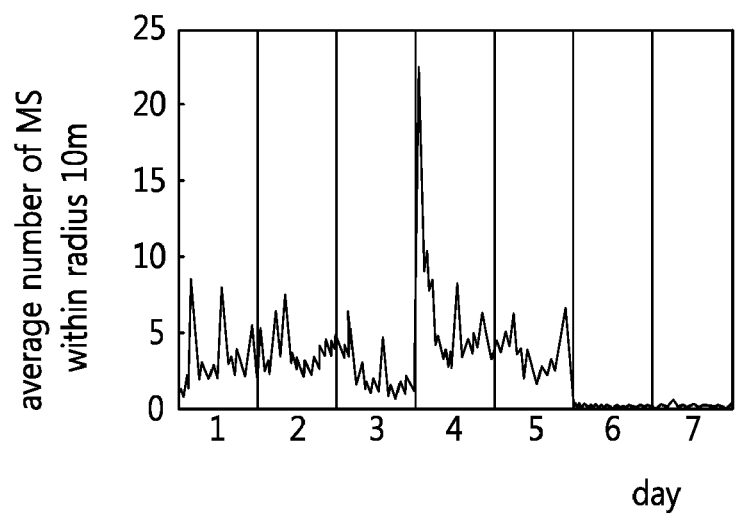

FIG. 3A and FIG. 4A show an 'MS-average distance' of an MS closest in distance to each MS on average. FIG. 3B and FIG. 4B show an 'MS-average number' of an MS located within a radius of 10 m from each MS on average.

As shown in FIG. 3 and FIG. 4, it can be seen that each of MSs maintains a distance less than 1 m from the nearest MS in all times in both the KAIST and NCSU campuses.

In addition, for weekdays only, not for weekends, it can be seen that 10 MSs exist on average within a distance of 10 m from each MS in KAIST, and 5 or more MSs exist on average within a distance of 10 m from each MS in NCSU.

In addition, it can be seen that the number of MSs within a distance of 10 m from each MS is significantly small on weekends (i.e., Saturday, Sunday) in comparison with weekdays.

In addition, if the MSs are located near the BS, a channel gain for the MSs is almost similar in randomness. The farther the MS is separated in distance from the BS, the more insensitive the change in the channel gain of the MSs.

Thereafter, a cluster head (CH) in a cluster, i.e., a representative MS among MSs belonging to the cluster, is determined (selected) (step S220). Likewise, the CH may be determined by the BS or by each MS.

The method of determining the CH will be described below in detail with reference to FIG. 7.

Thereafter, the determined CH transmits cluster information to the BS (step S230). The cluster information denotes (or includes) location information and channel gain information for MSs belonging to the cluster including the CH.

Hereinafter, a method of effectively managing a resource by a BS by using feedback information of MSs scheduled in a cluster and a CH by referring to FIG. 5.

Figure 5:
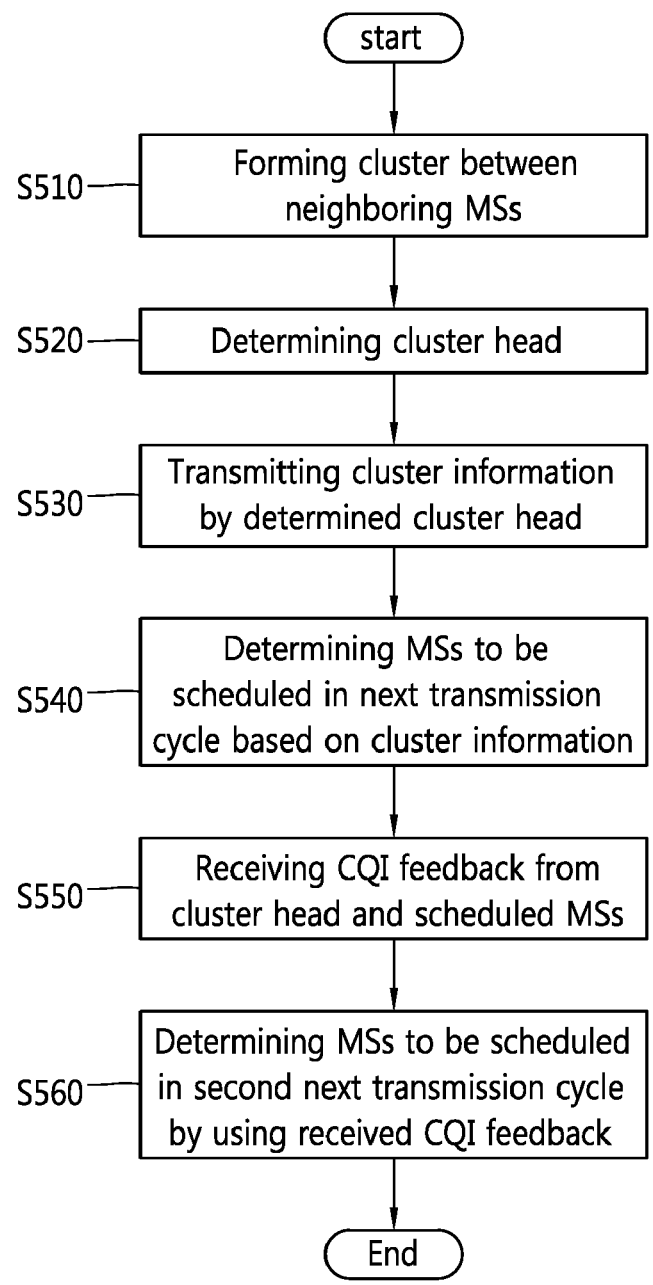
FIG. 5 is a flowchart showing a resource management method according to an embodiment of the present invention.

FIG. 5 is a flowchart showing a resource management method according to an embodiment of the present invention.

Since steps S510 to S530 are the same as steps S210 to S230, detailed descriptions thereof will be omitted, and only a difference thereof will be described.

When a cluster and a CH are determined through steps S510 and S530, a BS determines MSs to be scheduled in the cluster on the basis of a feedback received in every time slot (or every frame, every subframe).

That is, the BS determine the MSs to be scheduled in a next transmission cycle in the cluster on the basis of the cluster information received from the CH (step S540). Herein, the transmission cycle may be a time slot, a frame, or a subframe.

Thereafter, the BS receives a channel quality indicator (CQI) feedback from the CH and the MSs to be scheduled in the next transmission cycle in step S540 (step S550).

Thereafter, the BS determines the MSs to be scheduled in the cluster and the next transmission cycle by using a feedback received in step S550 (step S560).

That is, as described above, the BS may schedule an MS of a second next time slot on the basis of feedback information of a CH, i.e., a representative MS of the cluster, and feedback information of MSs to be scheduled in a next time slot.

Herein, a cycle for determining the CH is significantly different from a cycle of allocating resources to the MSs by the BS by the use of received feedback information.

This is because the cycle of determining the CH is determined depending on a change of topology based on an MS mobility, and the resources are allocated on a scale of msec. Therefore, the resources are allocated in a much smaller time scale after the cluster and the CH are determined.

A gain that can be obtained by the aforementioned resource management method of the BS is in proportion to the number of clusters/the total number of MSs. As the range of cluster to be formed is decreased, it can be achieved a performance similarly to an optimal method, that is, a method of resource management in which each of all MSs transmits its location and channel gain information to the BS.

Figure 6:
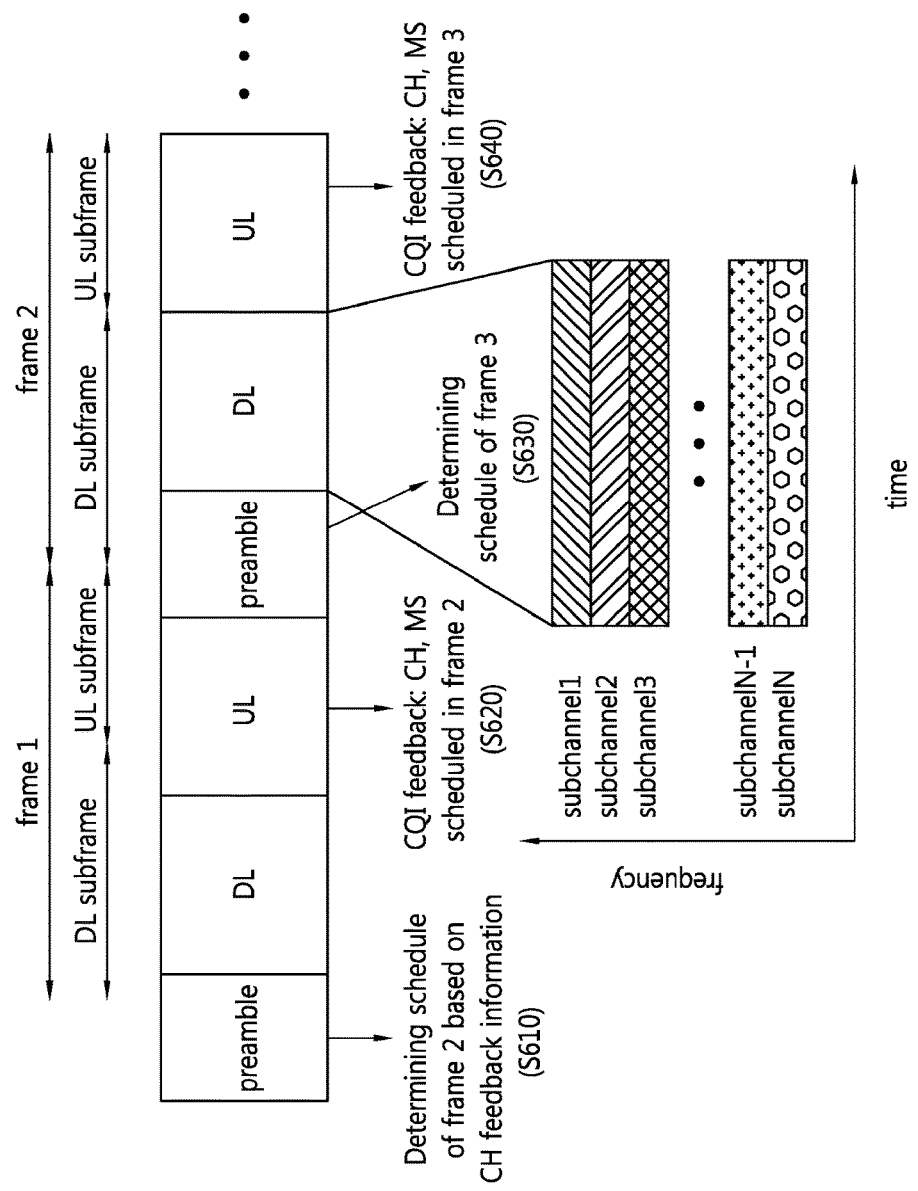
FIG. 6 shows an example of a frame structure for transmitting feedback information by a cluster head (CH) and scheduled MSs according to an embodiment of the present invention.

FIG. 6 shows an example of a frame structure for transmitting feedback information by a CH and scheduled MSs according to an embodiment of the present invention.

First, "Part 16: Air Interface for Fixed and Mobile Broadband Wireless Access Systems, IEEE Std. 802.16e-2005 and IEEE Std. 802.16-2004/corl-2005, December 2005." may be incorporated herein by reference as to the general content of a frame structure to which the embodiment of the present invention is applicable.

As shown in FIG. 6, a CH and MSs to be scheduled in a subsequent frame transmit a downlink CQI feedback to a BS through an uplink data channel of every frame. That is, the BS receives cluster information (or feedback information) via the CH through a preamble of a frame 1, and determines MSs to be scheduled in a frame 2 on the basis of the received information (step S610). Thereafter, the BS receives CQI feedback information from the CH and the MSs to be scheduled in the frame 2 through an uplink region of the frame 1 (step S620).

Likewise, the BS receives cluster information via the CH through a preamble of the frame 2, and determines MSs to be scheduled in a frame 3 on the basis of the received information (step S630). Thereafter, the BS receives CQI feedback information from the CH and the MSs to be scheduled in the frame 3 through an uplink region of the frame 2 (step S640).

Hereinafter, a method of determining MSs to be scheduled by a BS for resource allocation will be described.

An objective function of an overall resource allocation problem is as shown in Equation 1 below.

$$\max \sum_{k \in K} U(R_k) \qquad \text{[Equation 1]}$$

That is, Equation 1 above relates to a resource allocation problem for maximizing a sum of utility of all MSs in a network in the long-term. An optimization problem of finding MSs for optimizing a long-term objective function for every time slot through a pre-known gradient algorithm is to find an MS set which satisfies Equation 2 below.

"A. Stolyar, "On the asymptotic optimality of the gradient scheduling algorithm for multiuser throughput allocation," Operations Research, January, 2005" may be incorporated herein by reference as to the detailed content of the gradient algorithm.

$$\arg\max_I w_k r_k(t) \quad [\text{Equation 2}]$$

In Equation 2 above, $r_k(t)$ is a rate that can be achieved in a current time slot, and $w_k$ is a weight of a user (or MS) k, where k is defined by Equation 3 below.

$$w_k = \left.\frac{dU_k(R_k)}{dR_k}\right|_{R_k=R_k(t)} \quad [\text{Equation 3}]$$

In addition, if the MSs to be scheduled in a next frame are determined, the BS may receive a CQI feedback from the determined MSs, and may regulate power by Equation 4 below on the basis of the received CQI feedback.

$$p_s = \left[\frac{w_k}{\lambda\ln 2} - \frac{N}{g_s}\right]^+ \quad [\text{Equation 4}]$$

Herein, Equation 4 above corresponds to a well-known Water-filling type power control algorithm.

"D. P. Palomar and J. R. Fonollosa, "Practical algorithms for a family of waterfilling solutions," IEEE Trans. Signal Processing, vol. 53, no. 2, pp. 686-695, February 2005" may be incorporated herein by reference as to the detailed content of the Water-filling type power control algorithm.

Cluster Head (CH) Determination

Hereinafter, a method of determining a representative MS within a cluster, that is, a CH, will be described with reference to FIG. 7.

Figure 7:
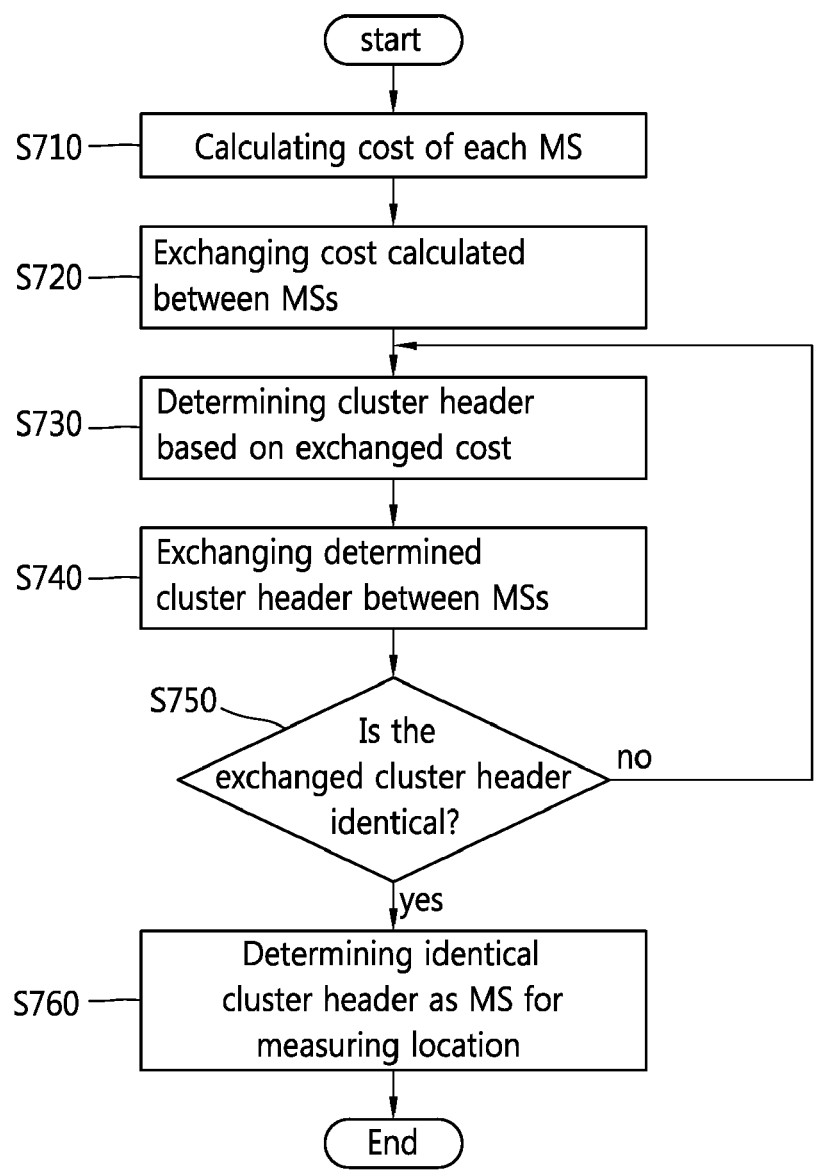
FIG. 7 is a flowchart showing a method of determining a CH according to an embodiment of the present invention.

FIG. 7 is a flowchart showing a method of determining a CH according to an embodiment of the present invention.

First, each of MSs belonging to one or more clusters calculates a cost (step S710).

Herein, each MS calculates the cost according to Equation 5 below.

$$C_i(t) = d_i(t)\frac{w_i T_i(t)}{E_{r,i}(t)}, \text{ where } d_i(t) = \frac{1}{\sum_{j\neq i} RSSI_{ji}(t)^\alpha} \quad [\text{Equation 5}]$$

Herein, $w_i T_i(t)$ is a factor for fairly using energy of MSs, $E_{r,i}(t)$ is a factor for maximizing a lifespan of the MS as longer as possible, and $d_i(t)$ is a factor for decreasing energy consumption and increasing accuracy of location measurement as longer as possible. More specifically, $E_{r,i}(t)$ denotes the remaining energy of an $i^{th}$ MS, $\{j\in J\}$ denotes a set of neighboring MSs, w, denotes a weight of the $i^{th}$ MS, Ti(t) denotes GPS location information of an $(i+1)^{th}$ MS, and $RSSI_{ji}$ denotes a received signal strength.

Thereafter, each of the MSs exchanges the cost calculated by each of the MSs by using SRC signaling (e.g., bluetooth, zigbee, etc.) (step S720).

Thereafter, each of the MSs determines a CH in a cluster to which the MS belongs, on the basis of the exchanged cost (step S730).

Thereafter, each of the MSs exchanges the determined CH (step S740).

Thereafter, whether the same CH is exchanged between the MSs is determined (step S750). Herein, whether the same CH is exchanged may be performed by the BS or each MS.

If the determination result shows that a different CH is exchanged between the MSs, each of the MSs repeats steps S730 and S750 until the same CH is exchanged between the MSs.

Thereafter, if the determination result shows that the same CH is exchanged between the MSs, the same CH is determined as a representative MS of a cluster for transmitting cluster information to the BS, that is, as a CH (step S760).

The aforementioned embodiments and modifications can be combined. Therefore, each embodiment can be implemented not only alone but also in combination if necessary. Since such a combination can be easily implemented by those ordinarily skilled in the art by reading the description of the present invention, the combination thereof is omitted herein. However, even if not described herein, it should be interpreted as being included in, not excluded from, the scope of the present invention.

The aforementioned embodiments and modifications can be implemented through various means. For example, the embodiments of the present invention can be implemented in hardware, firmware, software, combination of them, etc.

In case of the hardware implementation, the method according to the embodiments of the present invention can be implemented by one or more application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

In case of the firmware or software implementation, the method according to the embodiments of the present invention can be implemented in a form of a module, procedure, function, or the like for performing the aforementioned functions or operations. A software code may be stored in a memory unit and may be driven by a processor. The memory unit may be located inside or outside the processor, and may exchange data with the processor by using well-known various means.

For example, the method of the present invention may be stored in a storage medium (e.g., an internal memory, a flash memory, a hard disk, etc.), and may be implemented with codes or instructions in a software program executable by the processor (e.g., a microprocessor). This will be described below with reference to FIG. 8.

Figure 8:
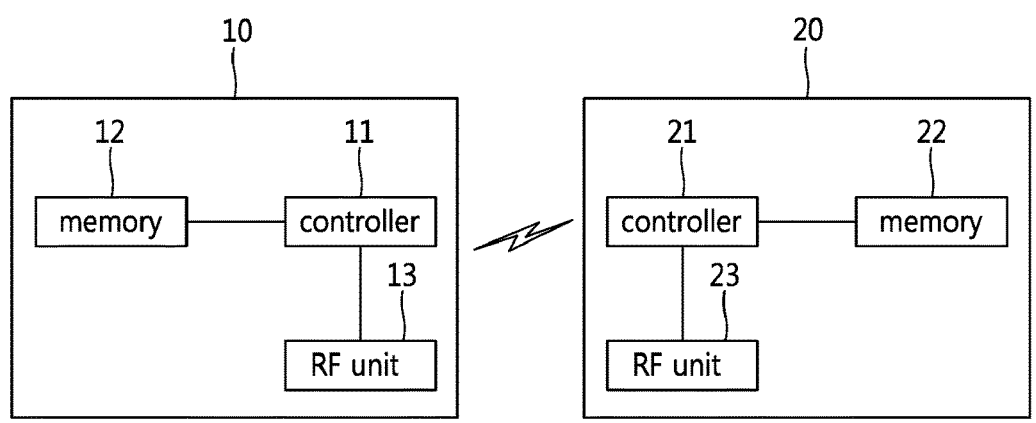
FIG. 8 is a block diagram showing internal structures of an MS and a base station (BS) in a wireless access system according to an embodiment of the present invention.

FIG. 8 is a block diagram showing internal structures of an MS and a BS in a wireless access system according to an embodiment of the present invention.

An MS 10 includes a controller 11, a memory 12, and a radio frequency (RF) unit 13.

Further, the MS also includes a display unit, a user interface unit, etc.

The controller 11 implements the proposed functions, procedures, and/or methods. Layers of a wireless interface protocol may be implemented by the controller 11.

The memory 12 is coupled to the controller 11, and stores a protocol or parameter for performing wireless communication. That is, the memory 12 stores an operating system of the MS, an application, and a general file.

The RF unit 13 is coupled to the controller 11, and transmits and/or receives an RF signal.

In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

A BS 20 includes a controller 21, a memory 22, and an RF unit 23.

The controller 21 implements the proposed functions, procedures, and/or methods. Layers of a wireless interface protocol may be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit. The memories 12 and 22 may include a read-only memory (ROM), a random access memory (RAM), a flash memory, a memory card, a storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module may be stored in the memories 12 and 22 and may be performed by the controllers 11 and 21.

The memories 12 and 22 may be located inside or outside the controllers 11 and 21, and may be coupled to the controllers 11 and 21 by using various well-known means.

In addition, the terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein are erroneous and thus fail to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms are intended to include the plural forms as well, unless the context clearly indicates otherwise. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

It will be understood that although the terms "first" and "second" are used herein to describe various elements, these elements should not be limited by these terms. These terms are only used to distinguish one element from another element. For example, a first component may be termed a second component, and similarly, the second component may be termed the first component without departing from the scope of the present invention.

When a component is mentioned as being "connected" to or "accessing" another component, this may mean that it is directly connected to or accessing the other component, but it is to be understood that there are no intervening components present. On the other hand, when a component is mentioned as being "directly connected" to or "directly accessing" another component, it is to be understood that there are no intervening components present.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparently understandable that an embodiment is configured by combining claims failing to have relation of explicit citation in the appended claims together or can be included as new claims by amendment after filing an application.

The invention claimed is:

1. A method of managing a resource by a base station in a wireless access system, the method comprising:
   receiving cluster information from a Cluster Head (CH),
      wherein the CH indicates a representative terminal among terminals belonging to a same cluster, and
      wherein the cluster information includes channel gain information and location information of all the terminals belonging to the same cluster;
   determining a first terminal based on the received cluster information,
      wherein the first terminal is determined to be scheduled in a next transmission cycle;
   receiving Channel Quality Indicator (CQI) feedback information only from the CH and the first terminal which is scheduled in the next transmission cycle; and
   determining a second terminal among the terminals belonging to the same cluster based on the CQI feedback information,
      wherein the second terminal is determined to be scheduled in the next transmission cycle after the first terminal,
      wherein the first terminal and the second terminal belong to the same cluster, and
      wherein the CH is determined by:
         (a) calculating, by the first terminal, a first cost;
         (b) transmitting, by the first terminal, the first cost to the second terminal;
         (c) receiving, by the first terminal from the second terminal, a second cost that is calculated by the second terminal;
         (d) selecting, by the first terminal, a first CH among the terminals based on the first cost and the second cost;
         (e) transmitting, by the first terminal to the second terminal, the first CH; and
         (f) receiving, by the first terminal from the second terminal, a second CH that is selected by the second terminal based on the first cost and the second cost,
            wherein if the first CH and the second CH are same, the first CH is determined to be the CH indicating the representative terminal among the terminals belonging to the same cluster, wherein if the first CH and the second CH are not the same, (d)-(f) are repeatedly performed until the first CH and the second CH are the same, and wherein each of the first cost and the second cost is calculated by the equation of:

$$C_i(t) = d_i(t) \frac{w_i T_i(t)}{E_{r,i}(t)}, \text{ where } d_i(t) = \frac{1}{\sum_{j \neq i} RSSI_{ji}(t)^\alpha},$$

where $E_{r,i}(t)$ indicates the residual energy of an $i^{th}$ terminal, $w_i$ indicates a weight of the $i^{th}$ terminal, $T_i(t)$ indicates GPS location information of an $(i+1)^{th}$ terminal, and $RSSI_{ji}$ denotes a received signal strength.

2. The method of claim 1, wherein the same cluster is formed between neighboring terminals by exchanging the location information for the terminals belonging to the same cluster.

3. The method of claim 1, wherein the first and second terminals use near field communication to exchange cost calculated by each of the first and second terminals, and wherein the near field communication is Bluetooth or Zigbee communication.

* * * * *